June 5, 1962
J. W. HOLES ET AL
3,037,618
PORTABLE STORAGE AND DISPLAY CABINET
Filed May 6, 1960
4 Sheets-Sheet 1
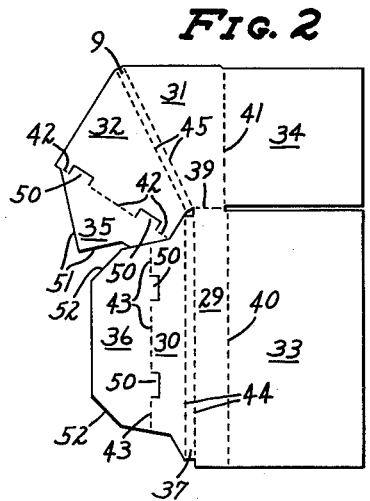
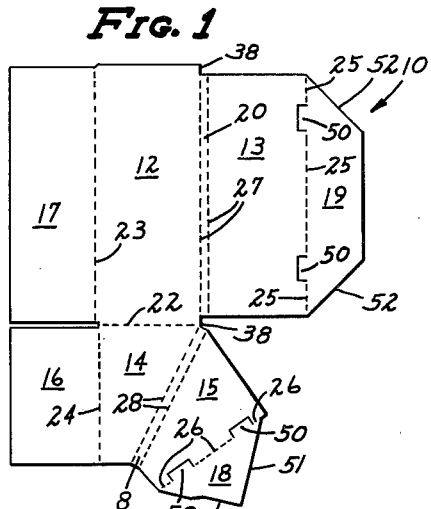
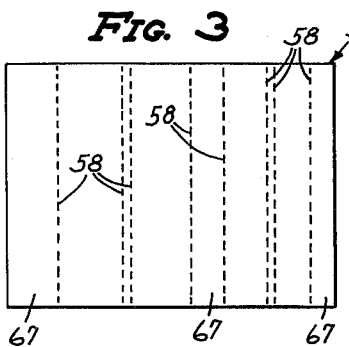
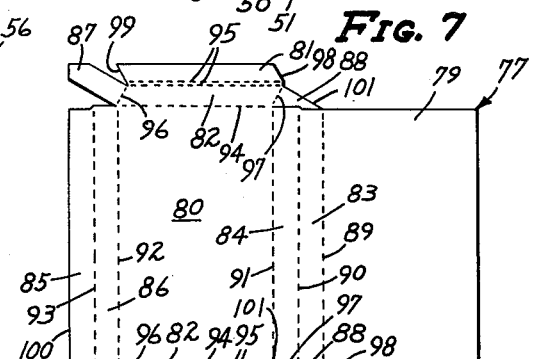
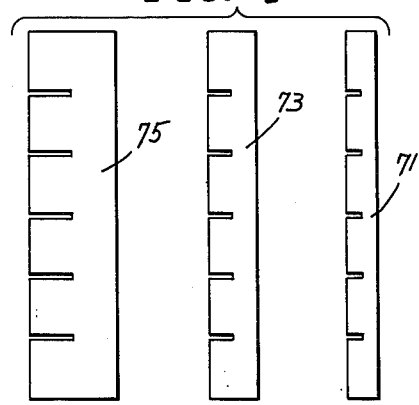
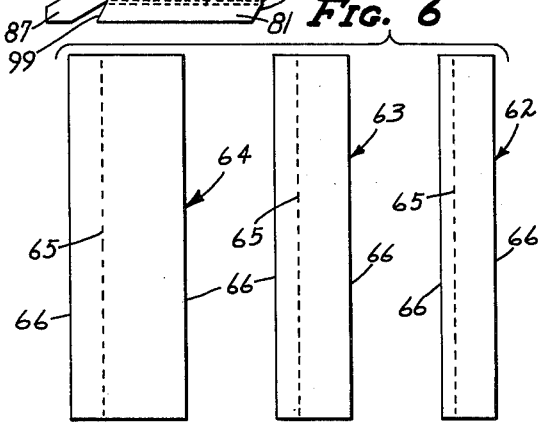
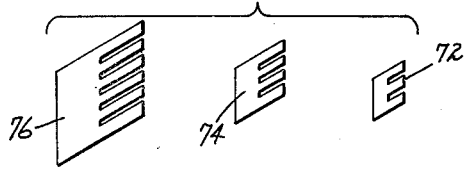
INVENTORS
JAMES W. HOLES
JACK E. STOWE
BY
Merchant & Merchant
ATTORNEYS June 5, 1962
J. W. HOLES ET AL
3,037,618
PORTABLE STORAGE AND DISPLAY CABINET
Filed May 6, 1960
4 Sheets—Sheet 2
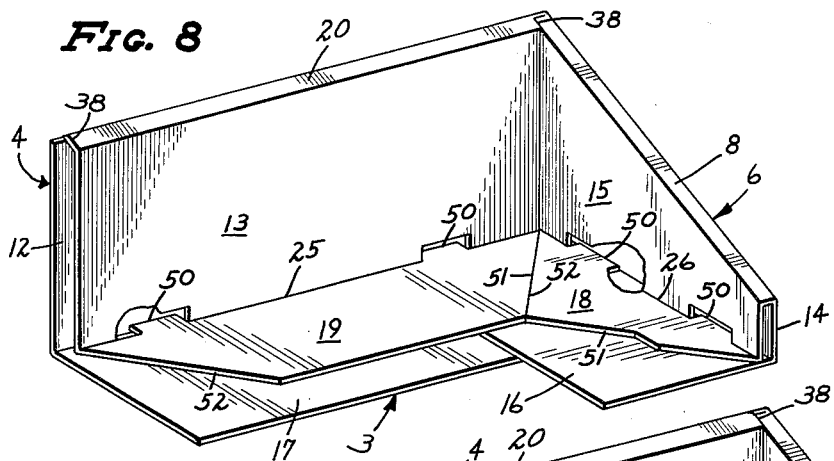
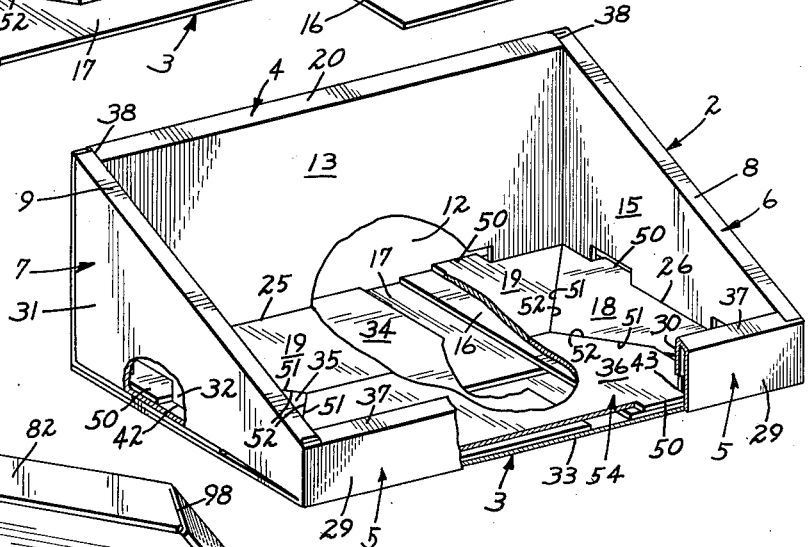
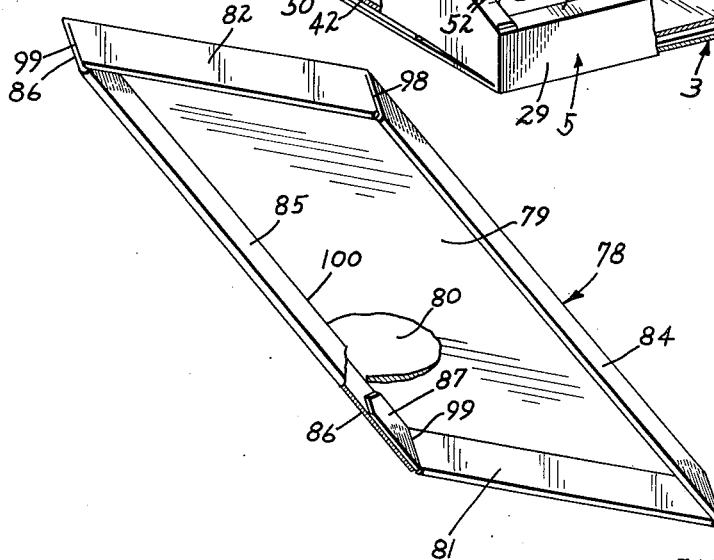
INVENTORS
JAMES W. HOLES
JACK E. STOWE
BY
Merchant & Merchant
ATTORNEYS June 5, 1962 J. W. HOLES ET AL 3,037,618
PORTABLE STORAGE AND DISPLAY CABINET
Filed May 6, 1960 4 Sheets-Sheet 3

INVENTOR.
JAMES W. HOLES
JACK E. STOWE
BY
Merchant & Merchant
ATTORNEYS

June 5, 1962     J. W. HOLES ET AL     3,037,618
PORTABLE STORAGE AND DISPLAY CABINET
Filed May 6, 1960     4 Sheets-Sheet 4

INVENTORS
JAMES W. HOLES
JACK E. STOWE
BY
Merchant & Merchant
ATTORNEYS

United States Patent Office 3,037,618
Patented June 5, 1962

3,037,618
PORTABLE STORAGE AND DISPLAY CABINET
James W. Holes, St. Cloud, and Jack E. Stowe, Minneapolis, Minn., assignors to W. W. Holes Manufacturing Co., St. Cloud, Minn., a corporation of Minnesota
Filed May 6, 1960, Ser. No. 27,358
6 Claims. (Cl. 206—45)

This invention relates generally to storage and display cabinets, and more particularly it relates to storage and display cabinets of the type which are particularly adapted to store and display a quantity of items in such position that they may be selectively removed as the need for them arises.

Still more specifically, this invention relates to a portable storage and display cabinet constructed from corrugated paper board and formed so as to provide for the indexing, storage and display of assorted categorized items.

Cabinets of the class described have been particularly useful to sign painters and other decorators for the storage and display of alphabetical characters, numerals and other items used in the trade. However, such cabinets have previously been constructed from wood, fibreboard, metal or other relatively expensive materials. Therefore, such previous constructions have been heavy and bulky to handle and transport, have required a large amount of space for their storage, and relatively expensive in their manufacture and assembly. In light of these problems, previous constructions of such cabinets have obviously not been characterized with optimum satisfaction. Although the foregoing problems are excellently illustrated in the sign painters cabinet, they are not so limited in occurrence. Thus, the foregoing is not intended to restrict the solutions which the present invention affords to application with sign painters cabinets nor even to other types of cabinets used in the related decorating trades, inasmuch as many other forms of cabinets and similar storing containers, generally referred to herein as cabinets, may be similarly effected by the application of this invention.

In light of the above, an important object of this invention is the provision of a portable storage and display cabinet which, in addition to being constructed so as to appear structurally strong, actually possesses great strength with respect to the material from which it is made because of the novel construction and assembly of its various parts.

Another object of this invention is the provision of a portable storage and display cabinet having novel constructional features adapted for ease of manufacture and assembly.

A further object of this invention is the provision of a portable storage and display cabinet of double wall construction, which construction possesses inherent characteristics of structural strength.

A still further object of this invention is the provision of a portable storage and display cabinet which is made of a minimum of components which are so designed so that they may be cut from a minimum of material.

Still another object of this invention is the provision of a high strength portable storage and display cabinet having novel folding characteristics adapted to provide high strength and easy portability.

A further object of this invention is the provision of an improved portable storage and display cabinet in which the folding elements thereof may be easily integrated with the stationary elements thereof so as to provide a rigid easily foldable container.

Still another object of this invention is the provision of a portable storage and display cabinet which may be shipped and stored in a flattened position although being extremely easy to assemble.

Other objects of this invention reside in the provision of a light-weight portable storage and dispensing cabinet which is inexpensive to produce, durable and strong throughout continued use, and highly efficient in the vindication of its purposes.

The above and still further objects of this invention will become apparent from the following detailed specification, appended claims and attached drawings.

Referring to the drawings wherein like reference characters indicate like parts or elements throughout the several views.

FIG. 1 is a plan view of one of the blanks from which the box portion of the cabinet is formed, scored portions thereof being represented by dotted lines and cut portions thereof being represented by full lines;

FIG. 2 is a plan view of the other of the blanks from which the box portion of the cabinet is formed, scored portions thereof being represented by dotted lines and cut portions thereof being represented by full lines;

FIG. 3 is a plan view of the dividing panel, scored portions thereof being represented by dotted lines;

FIG. 4 is a plan view of the different sizes of elongated partition elements;

FIG. 5 is a plan view of the different sizes of transverse partition elements;

FIG. 6 is a plan view of the different sizes of compartment risers, scored portions thereof being represented by dotted lines;

FIG. 7 is a plan view of the blank from which the top of the cabinet is formed, scored portions thereof being represented by dotted lines and cut portions thereof being represented by full lines;

FIG. 8 is an enlarged view in perspective of the blank shown in FIG. 1 and showing the folded position thereof, some parts being broken away;

FIG. 9 is an enlarged view in perspective of the blank shown in FIGS. 1 and 2 in their folded box-forming position, some parts being broken away and some parts shown in section;

FIG. 10 is an enlarged view in perspective of the top in its completely folded position, some parts being broken away and some parts shown in section;

Figure 11:
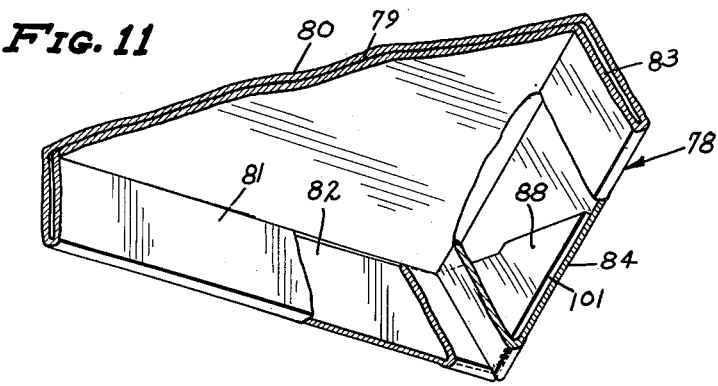
FIG. 11 is a further enlarged fragmentary view in perspective of one of the corners of the top in its completely folded position, some parts being broken away and some parts shown in section.

Referring with greater particularity to the drawings, the reference numeral 1 represents the portable storage and display cabinet in its entirety which comprises an open-topped rigid double-ply box portion, represented generally by the reference numeral 2. The box portion 2 is preferably formed from corrugated paper board, as are the remaining parts of my invention. The box portion 2 comprises a generally rectangular double-ply bottom wall, represented generally by the reference numeral 3; a relatively high double-ply back wall, represented generally by the reference numeral 4; a relatively low double-ply front wall, represented generally by the reference numeral 5; and opposite double-ply end walls, represented generally by the reference numerals 6, 7 respectively. The upper respective transverse edge panels 8, 9 of the opposite end walls 6, 7 slope from the high back wall 4 to the low front wall 5.

In accordance with my invention, the back wall 4, the adjacent end wall 6 and a portion of the back wall 3 are integrally formed from the blank, represented generally by the reference numeral 10, of corrugated paper board which is cut and scored in the manner shown particularly in FIG. 1. Also the front wall 5, the other end wall 7 and the remainder of the back wall 3 are integrally formed from another blank, represented generally by the reference numeral 11, of corrugated paper board, which is cut and scored in the manner shown particularly in FIG. 2. Referring to the blank 10 shown in FIG. 1, the same comprises more particularly a back wall outer ply 12, a back wall inner ply 13, an end wall outer ply 14, an end wall inner ply 15, an intermediate bottom end flap 16, an intermediate bottom side flap 17, an upper ply bottom end flap 18, and an upper ply bottom side flap 19. It will be noted that the back wall outer ply 12 and the back wall inner ply 13 are separated by an integrally formed upper transverse back edge panel 20, and that the end wall outer ply 14 and the end wall inner ply 15 are separated by the integrally formed upper transverse end edge panel 8.

Referring again to the blank 10 shown in FIG. 1, the back wall outer ply 12 and the end wall outer ply 14 are separately defined by the score line 22, the back wall outer ply 12 and the intermediate bottom side flap 17 are separately defined by the score line 23, and the end wall outer ply 14 and the intermediate bottom end flap 16 are separately defined by the score line 24. Also, the back wall inner play 13 and the upper ply bottom side flap 19 are separately defined by the score lines 25 and the end wall inner ply 15 and the upper ply bottom end flap 18 are separately defined by the score lines 26. The upper transverse back edge panel 20 is separately defined from the back wall inner and outer plies 12, 13 by the score lines 27, and the upper transverse end edge panel 8 is separately defined from the end wall outer and inner plies 14, 15 by the score lines 28.

With reference to the blank 11 shown in FIG. 2, the same comprises more particularly a front wall outer ply 29, a front wall inner ply 30, an end wall outer ply 31, an end wall inner ply 32, an outer ply bottom flap 33, an intermediate bottom end flap 34, an upper ply bottom end flap 35, and an upper ply bottom side flap 36. The front wall outer and inner plies 29, 30 are separated by the integrally formed upper transverse front edge panel 37, and the end wall outer and inner plies 31, 32 are separated by the integrally formed upper transverse end edge panel 9. It should also be noted, that the front wall outer ply 29 and the end wall outer ply 31 are separately defined by the score line 39, that the front wall outer ply 29 and the outer ply bottom flap 33 are separately defined by the score line 40, and that the end wall outer ply 31 and the intermediate bottom end flap 34 are separately defined by the score line 41. Also, the end wall inner ply 32 and the upper ply bottom end flap 35 are separately defined by the score lines 42, and the front wall inner ply 30 and the upper ply bottom side flap 36 are separately defined by the score lines 43. Also, the upper transverse front edge panel 37 is separately defined from the front wall outer and inner plies 29, 30 by the score lines 44, and the upper transverse side edge panel 9 is separately defined from the end wall outer and inner plies 31, 32 by the score lines 45.

Turning now to the folded position of the blank 10, as seen particularly in FIG. 8, it will be noted that the back wall outer and inner plies 12, 13 and the end wall outer and inner plies 14, 15 are disposed in spaced relationship to one another, the spacing therebetween being determined by the transverse width of the upper transverse back and end edge panels 20, 8. The upper transverse edge panels 8, 9, 20, 37 are cut so as to define corner notches 38 in order to make said transverse edge panels 8, 9, 20, 37 unitly smooth and generally coplanar. When the blank 10 is disposed in its folded position as shown in FIG. 8, it will be noted that the intermediate bottom end flap 16 is interposed between the intermediate bottom side flap 17 and the upper ply bottom end and side flaps 18, 19.

After the blank 11 is folded in a manner similar to the folding of the blank 10, the two blanks 10, 11 are fitted together to form the box portion 2 of the cabinet 1, as seen particularly in FIG. 9. When the blanks 10, 11 are so united, the outer ply bottom flap 33 forms the complete bottom ply of the box portion 2, then the intermediate bottom side flap 17 is disposed on top of the outer ply bottom flap 33, and the intermediate bottom end flaps 16, 34 are disposed thereon, as shown particularly by the cutaway portion of FIG. 9. Of course, the upper ply bottom end flaps 18, 35 and the upper ply bottom side flaps 19, 36 abut together to form the upper ply of the bottom wall 3, as will hereinafter be described with greater particularity.

Since the means for regulating the spacing between the outer and inner plies 12 and 13, 14 and 15, 29 and 30, and 31 and 32 of the walls 4, 6, 5, 7, respectively, is of particular importance in the proper use of this invention, the same will hereinafter be particularly described. At the bottom edges defined by the score lines 25, 43, 26, 42 of said back, front and end wall inner plies 13, 30, 15, 32, the latter are cut so as to define spacing tabs 50 which extend toward and abut against the back, front and end wall outer plies 12, 29, 14, 31 when the box portion 2 is assembled as shown in FIG. 9 whereby to maintain the inner wall plies 13, 30, 15, 32 uniformly spaced with respect to said outer wall plies 12, 29, 14, 31. It will also be noted that the score lines 25, 26, 42, 43 are interrupted at the definition of the spacing tabs 50 so as to permit the spacing tabs 50 to be integrally formed with the upper ply bottom flaps 19, 18, 35, 36. It should be obvious that the extending width of the spacing tabs 50 should correspond approximately to the transverse width of the upper transverse edge panels 8, 9, 20, 37 so as to maintain the inner plies 13, 30, 15, 32 rigidly and uniformly spaced from the outer plies 12, 29, 14, 31 at all times when the box portion 2 is in its assembled position.

The particular construction of the upper ply bottom flaps 18, 19, 35, 36 is of no little importance to my invention since the same enables the blanks 10, 11 to be cut from a minimum of material and also adds greatly to the structure rigidity of the box portion 2. It will be noted that the opposed upper ply bottom end flaps 18, 35 are generally triangular in shape, the angular edges thereof being represented by the reference numeral 51. The upper ply bottom side flaps 19, 36 are also each formed with converging edges 52, and both have generally parallel longitudinal edges 53 which meet in abutment when the box portion 2 is assembled as shown in FIG. 9. It will also be seen by reference to FIG. 9 that the angular edges 51 of the upper ply bottom end flaps 18, 35 meet in abutment with the converging edges 52 of the upper ply bottom side flaps 19, 36 when the box portion 2 is assembled in said position so as to form a unified upper ply, represented generally by the reference numeral 54, of the bottom wall 3. The unified upper ply 54 completely covers the intermediate bottom flaps 16, 17, 34, which are so spaced as to underlyingly span the junction of the edges 51, 52, 53 when the box portion 2 is in its assembled position.

Figure 12:
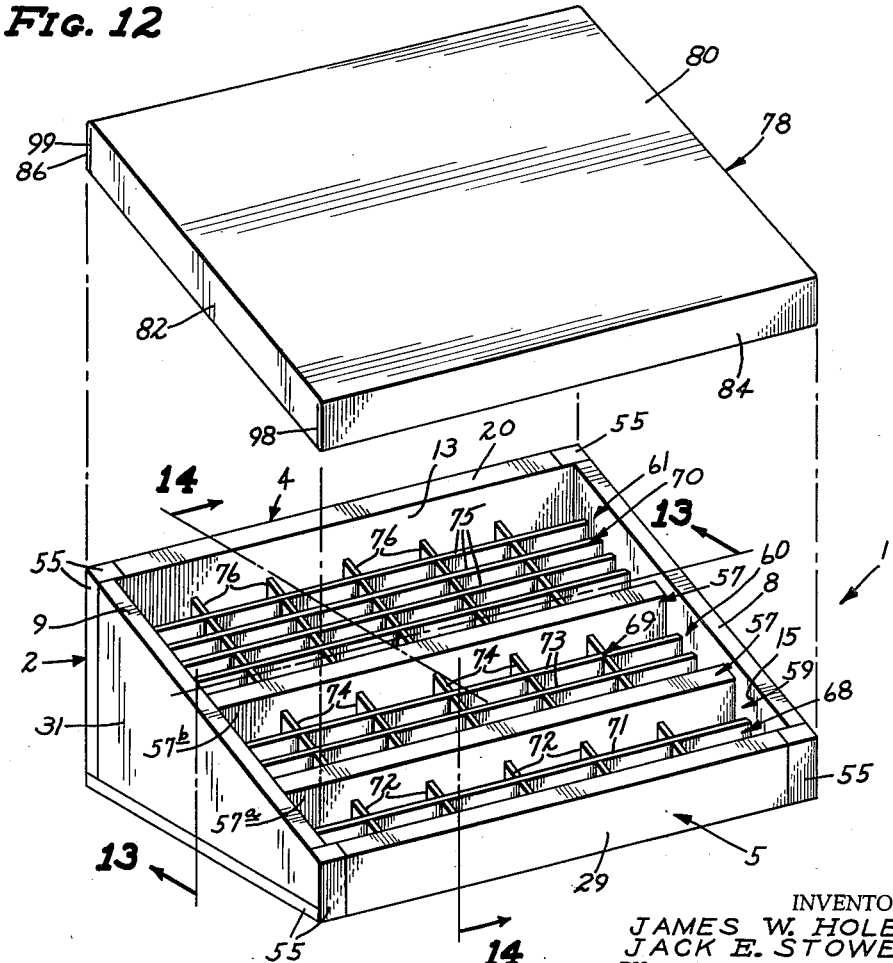
FIG. 12 is a view in perspective of the cabinet in its completely assembled position and with its top shown in an exploded position thereabove.

In accordance with my invention, and by reference to FIG. 12, it will be noted that after the box portion 2 is assembled as shown in FIG. 9, the exterior joints between the folded portions thereof are covered with tape 55 in the conventional manner so as to add rigid security to the box portion 2.

Figure 13:
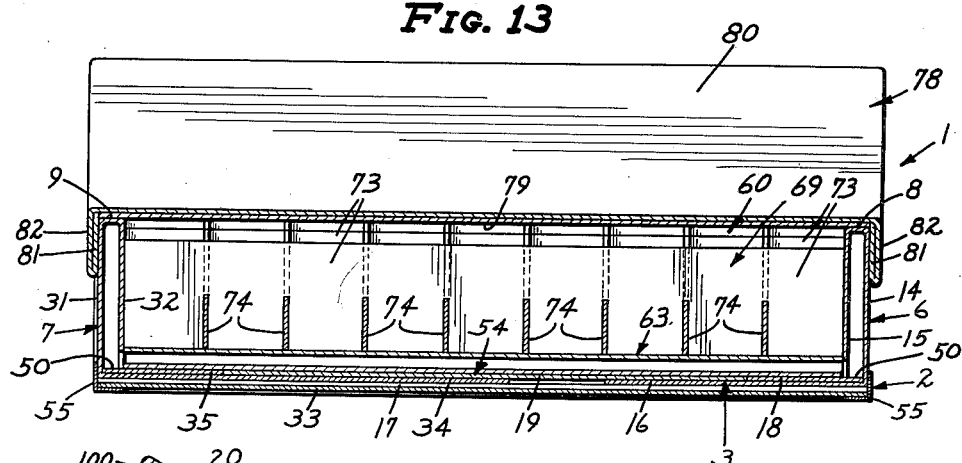
FIG. 13 is an enlarged view in vertical section taken on the line 13—13 of FIG. 12.
Figure 14:
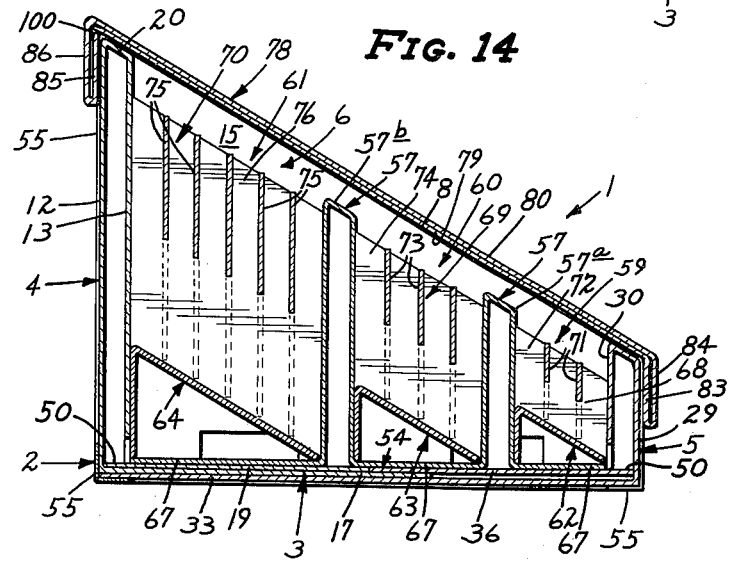
FIG. 14 is an enlarged view in vertical section taken on the line 14—14 of FIG. 12.

Having specifically described the construction and assembly of the box portion 2 of the cabinet 1, the remaining parts which cooperate with the box portion 2 to form the cabinet 1 will be specifically described. FIG. 3 shows the dividing blank, represented in its entirety by the reference numeral 56, from which the dividers, represented generally by the reference numeral 57, are formed by folding the blank 56 along the score lines 58. By referring to FIG. 14, it will be seen that the dividing blank 56 is folded along the score lines 58 so as to form a pair of elongated upstanding dividers 57 which are disposed in progressively higher relationship from the front wall 5 to the back wall 4 of the box portion 3, the lower divider being represented by the reference character 57a and the higher divider being represented by the reference character 57b. The dividers 57 cooperate with the box portion 2 so as to form three compartments, which are progressively larger from the front wall 5 to the back wall 4, said compartments being represented by the reference numerals 59, 60, 61 with respect to their progression from the front wall 5 to the back wall 4 of the box portion 2. The elongated compartment risers, shown in blank form in FIG. 6 and represented by the reference numerals 62, 63, 64, are folded along the score lines 65 and received within the compartments 59, 60, 61 with their free longitudinal edges 66 dependingly engaging the compartment bottoms 67, which are folded from the dividing blank 56. By referring to FIGS. 12, 13, and 14 it will be seen that the compartments 59, 60, 61 are further partitioned by the insertion of the interlocking partition sections, which are represented generally by the reference numerals 68, 69, 70 in relation to their progressing size from the reception thereof within the smallest compartment 59 to the largest compartment 61. FIGS. 4 and 5 show the different sizes of partition elements which interlock to make up the partition sections 68, 69, 70. The smallest partition section 68 comprises elongated partition elements 71 and transverse partition elements 72; the partition section 69 comprises elongated partition elements 73 and transverse partition elements 74; and the largest partition section 70 comprises elongated partition elements 75 and transverse partition elements 76; all of which cooperate with the dividers 57, the compartment risers 62, 63, 64 and the box portion 2 so as to provide for the indexing, storage and display of assorted categorized items, not shown.

FIG. 7 shows the blank, represented in its entirety by the reference numeral 77, which forms the cabinet top or lid, the same in its folded position being represented in general by the reference numeral 78. The top blank 77 comprises an inner top panel 79, an outer top panel 80, inner end panels 81, outer end panels 82, an inner front panel 83, an outer front panel 84, an inner back panel 85, an outer back panel 86, back locking tabs 87, and front locking tabs 88. Referring further to the top blank 77, the inner top panel 79 and the inner front panel 83 are separately defined by the score line 89; the inner front panel 83 and the outer front panel 84 are separately defined by the score line 90; the outer front panel 84 and the outer top panel 80 are separately defined by the score line 91; the outer top panel 80 and the outer back panel 86 are separately defined by the score line 92; and the outer back panel 86 and the inner back panel 85 are separately defined by the score line 93. Also, the outer end panels 82 are separately defined from the outer top panel 80 by the score lines 94; the inner end panels 81 are separately defined from the outer end panels 82 by the closely spaced generally parallel score lines 95; the back locking tabs 87 are separately defined from the outer end panels 82 by the score lines 96; and the front locking tabs 88 are separately defined from the outer end panels 82 by the score lines 97.

Having specifically described the foldable components of the cabinet top 78, the steps to be followed in folding the top blanks 77 should be briefly outlined. First, and in particular reference to FIGS. 10–12, the inner end panels 81 are both folded flat against the outer end panels 82, and both pair thereof are then folded to a position in general normality with the outer top panel 80, the front locking tabs 88 being folded along the score lines 97 to an inwardly facing position and general normality with their respective inner and outer end panels 81, 82. Then, the outer front panel 84 is folded along the score line 91 to a rearwardly inclining position in abutment with the rearwardly inclining front edges 98 of the inner and outer end panels 81, 82. Thereafter, the inner top panel 79 and the inner front panel 83 are folded along the score lines 89, 90 to a position wherein the inner front panel 83 is disposed in spaced generally parallel relation with the outer front panel 84, the front locking tabs 88 being interposed therebetween, and the inner top panels 79 being disposed flatly against the outer top panel 80. Finally, after folding the back locking tabs 87 along the score lines 96 to an inwardly facing position in general normality with their respective end panels 81, 82, the outer back panel 86 is folded to a rearwardly inclined position in abutment with the rearwardly inclining rear edges 99 of the end panels 81, 82, and the inner back panel 85 is then folded along the score line 93 to a locking position spaced from but in general parallelity with the outer back panel 86, the back locking tabs 87 being interposed therebetween. It is the angular engagement of the longitudinal edge 100 of the inner back panel 85 with the inner top panel 79 that holds the top 78 in its completely folded position. FIG. 11 shows the folded position of the front locking tabs 88 wherein the straight edge 101 thereof abuts against the fold along the score line 90 so as to add stability to said top 78. It is the above described folding operation of the back panel 85, coupled with the locking action of the tabs 87, 88 that provides the self-fastening cabinet top 78 which requires no other fastening means to satisfactorily hold the same together.

Having specifically described the construction and assembly of my invention, it should be obvious that a portable storage and display cabinet which possesses substantial utility is provided. Since the complete assembly of my invention has already been described, it is thought that the operation thereof may be satisfactorily explained merely by saying that the partition compartments 59, 60, 61 are adapted to receive assorted categorized items, such as alphabetical characters and numerals, so as to provide for the indexing, storage and display thereof.

This invention has been thoroughly tested and found to be completely satisfactory for the accomplishment of the above objects; and while I have shown a preferred embodiment thereof, I wish it to be specifically understood that the same may be modified without departure from the scope and spirit of the appended claims.

What is claimed is:

1. In a portable storage and display cabinet of multiple layer wall construction having a bottom wall, two end walls, a relatively high back wall and a relatively low front wall, all formed of corrugated paper board, the improvement wherein two plies of the back wall, two plies of one end wall, a first and second portion of the upper ply of the bottom wall, and a first and second portion of an intermediate ply of the bottom wall are formed from a first blank, and wherein two plies of the front wall, two plies of the other end wall, the lower ply of the bottom wall, a third and fourth portion of the upper ply of the bottom wall and a third portion of the intermediate ply of the bottom wall are formed from a second blank, said blanks being folded to form the multi-ply structure and wherein said intermediate plies are interfitted between the upper and lower plies of the bottom wall, and are contoured to form a substantially complete intermediate ply.

2. The structure as defined in claim 1 includes a plurality of separator members formed of corrugated paper board for dividing the interior of the cabinet into a plurality of compartments.

3. The structure as defined in claim 1 including a lid having a top, two ends, back and a front, formed from a single blank and fitted over the upper edges of said cabinet.

4. The structure as defined in claim 1 wherein the first portion of the upper ply of the bottom wall and the first portion of the intermediate ply of the bottom wall are integral with the portion of the first blank which forms the two plies of the back wall and wherein the other plies of said bottom wall on said first blank are integral with the portion which is folded to form the two plies of the end wall and wherein the third portion of the upper ply of the bottom wall and the lower ply of the bottom wall are integral with the portion of the second blank which is folded to form the front wall, and wherein the third portion of the upper ply and the fourth portion of the intermediate ply of the bottom wall are integral with that portion of the second blank which is folded to form the other end wall.

5. The structure as defined in claim 1, wherein the back, front and end wall plies comprise spaced inner and outer plies.

6. The structure as defined in claim 5 wherein portions of the upper ply of the bottom wall are provided with tabs extending through the inner ply and engaging the outer ply, to maintain spacing of the inner and outer plies of the front, back and end walls.

References Cited in the file of this patent

UNITED STATES PATENTS

| | | |
|---|---|---|
| 502,952 | Craw | Aug. 8, 1893 |
| 1,460,185 | Webster | June 26, 1923 |
| 1,982,663 | Hoffmaster | Dec. 4, 1934 |
| 2,308,818 | Levfoff | Jan. 19, 1943 |
| 2,518,779 | Hennessey | Aug. 15, 1950 |

FOREIGN PATENTS

| | | |
|---|---|---|
| 19,090 | Great Britain | 1894 |